US011900383B2

(12) United States Patent
Qu et al.

(10) Patent No.: US 11,900,383 B2
(45) Date of Patent: *Feb. 13, 2024

(54) SYSTEM, METHOD, AND COMPUTER PROGRAM PRODUCT FOR DETERMINING FRAUD RULES

(71) Applicants: Visa International Service Association, San Francisco, CA (US); Board of Regents, The University of Texas System, Austin, TX (US)

(72) Inventors: Youxing Qu, Austin, TX (US); Yiwei Cai, Mercer Island, WA (US); Dan Wang, Austin, TX (US); Harishkumar Sundarji Majithiya, Austin, TX (US); Roshni Ann Samuel, Cedar Park, TX (US); Susan Finnegan, San Jose, CA (US); Claudia Barcenas, Austin, TX (US); Himanshu Chauhan, Seattle, WA (US)

(73) Assignees: Visa International Service Association, San Francisco, CA (US); Board of Regents, The University of Texas System, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/686,607

(22) Filed: Mar. 4, 2022

(65) Prior Publication Data

US 2022/0391911 A1 Dec. 8, 2022

Related U.S. Application Data

(63) Continuation of application No. 16/960,593, filed as application No. PCT/US2019/012629 on Jan. 8, 2019, now Pat. No. 11,288,674.

(Continued)

(51) Int. Cl.
G06Q 20/40 (2012.01)
G06Q 40/02 (2023.01)
G06N 5/01 (2023.01)

(52) U.S. Cl.
CPC .......... *G06Q 20/4016* (2013.01); *G06N 5/01* (2023.01); *G06Q 40/02* (2013.01)

(58) Field of Classification Search
CPC ...... G06Q 20/4016; G06Q 40/02; G06N 5/01; G06N 5/025; G06N 20/20
See application file for complete search history.

(56) References Cited

U.S. PATENT DOCUMENTS 8,719,166 B2 5/2014 Ganti
10,607,228 B1 * 3/2020 Gai ........................ G06N 5/046
(Continued)

OTHER PUBLICATIONS

"How to Comply with the Privacy of Consumer Financial Information Rule of the Gramm-Leach-Bliley Act: A Guide for Small Business from the Federal Trade Commission", Federal Trade Commission, 2002, pp. 1-19.
(Continued)

*Primary Examiner* — Sonji N Johnson
(74) *Attorney, Agent, or Firm* — The Webb Law Firm

(57) ABSTRACT

Methods for generating fraud detection rules based on transaction data may include receiving historical transaction data, associating tags with each transaction, generating decision trees having root nodes and child nodes operably connected to the respective root nodes, determining at least one primary rule and at least one set of secondary rules associated with the at least one primary rule based on relationships between features of the transactions, assigning primary rules and sets of secondary rules to the at least one decision tree to populate the tree, extracting a plurality of rule sets including at least one primary rule and one or more secondary rules, determining an ordering of the plurality of (Continued)

rule sets; and determining a subset of rule sets from the ordered plurality of rule sets against which subsequently received transactions are compared against to determine if the subsequent transactions are fraudulent.

20 Claims, 4 Drawing Sheets

Related U.S. Application Data

(60) Provisional application No. 62/614,668, filed on Jan. 8, 2018.

(56) References Cited

U.S. PATENT DOCUMENTS

| | | | |
|---|---|---|---|
| 11,288,674 B2 * | 3/2022 | Qu | G06N 5/025 |
| 2007/0226095 A1 | 9/2007 | Petriuc | |
| 2010/0287099 A1 | 11/2010 | Liu et al. | |
| 2011/0196791 A1 | 8/2011 | Dominguez | |
| 2013/0080368 A1 | 3/2013 | Nandy | |
| 2013/0346294 A1 | 3/2013 | Faith et al. | |
| 2016/0132886 A1 | 5/2016 | Burke et al. | |
| 2016/0140544 A1 | 5/2016 | Howe et al. | |
| 2016/0292690 A1 | 10/2016 | Faith et al. | |
| 2017/0221075 A1 * | 8/2017 | Wang | G06N 20/00 |
| 2018/0204217 A1 | 7/2018 | Bedi et al. | |
| 2018/0365578 A1 | 12/2018 | Naughton et al. | |
| 2019/0385188 A1 | 12/2019 | Rao et al. | |

OTHER PUBLICATIONS

"ISO 8583-1987 Data Elements Definitions", MasterCard Debit Switch Operations Manual, Section 4, Sep. 1998, pp. 1-165.

"Final Rule: Privacy of Consumer Information (Regulation S-P)", Securities & Exchange Commission, 2003, pp. 1-90.

Chan et al., "Distributed Data Mining in Credit Card Fraud Detection", IEEE Intelligent Systems' Special Issue on Data Mining, 1999, pp. 1-16.

* cited by examiner

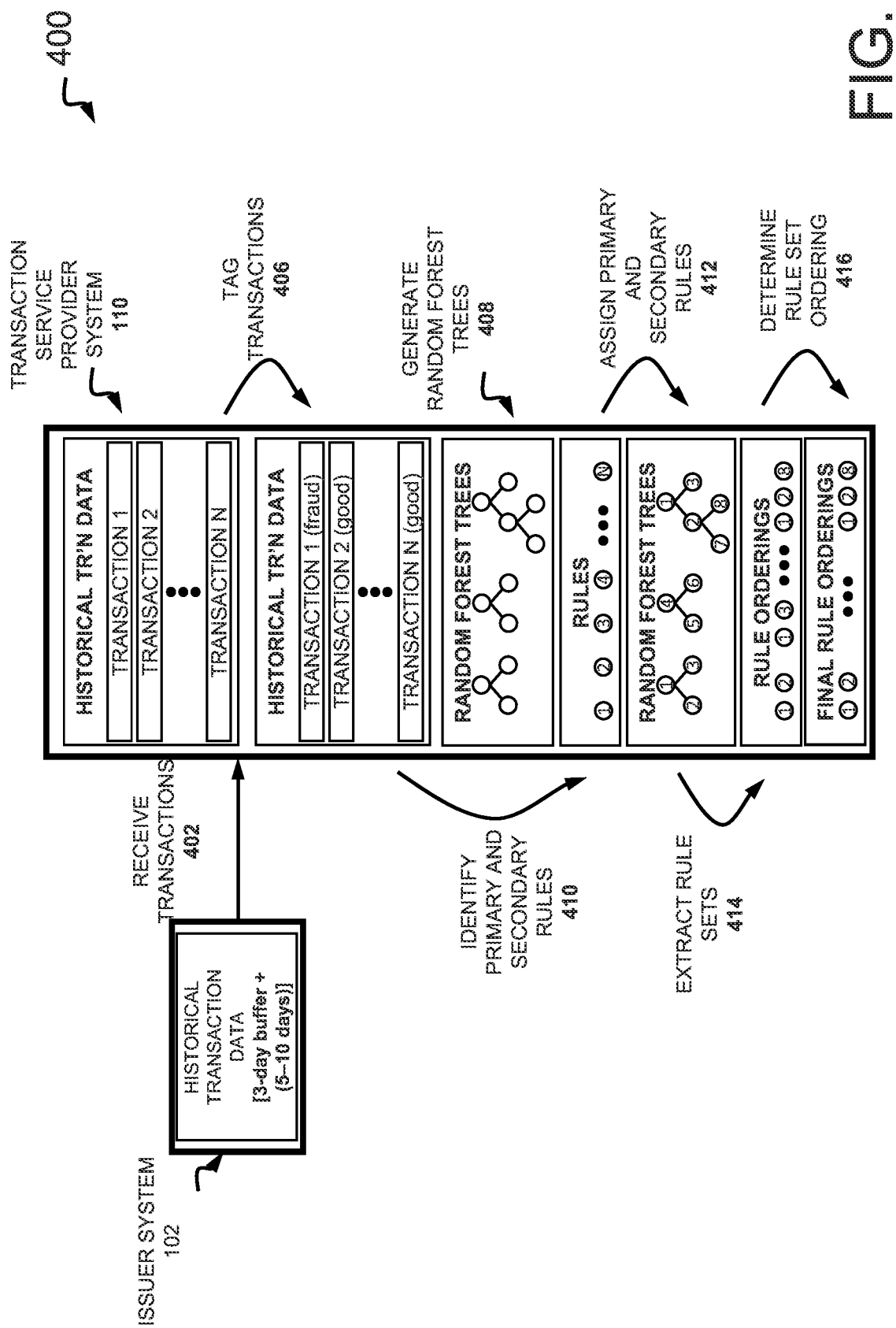

SYSTEM, METHOD, AND COMPUTER PROGRAM PRODUCT FOR DETERMINING FRAUD RULES

CROSS REFERENCE TO RELATED APPLICATIONS

This application is a continuation application of U.S. patent application Ser. No. 16/960,593 filed on Jul. 8, 2020, which is the United States national phase of International Application No. PCT/US2019/012629 filed on Jan. 8, 2019, and claims priority to U.S. Provisional Patent Application No. 62/614,668 filed on Jan. 8, 2018, the disclosures of which are hereby incorporated by reference in their entirety.

BACKGROUND

1. Technical Field

This disclosure relates generally to determining fraud rules and, in some non-limiting embodiments or aspects, systems and methods for generating a set of fraud detection rules based on historical transaction data including both non-fraudulent transactions and fraudulent transactions.

2. Technical Considerations

Techniques have been developed to monitor transactions and identify fraudulent transactions before, or soon after, such transactions are initiated. To better identify these fraudulent transactions, fraud rules were developed to automatically detect fraudulent activity. For example, fraud rules may be used to determine if a payment transaction is fraudulent, or if a payment account has been compromised. These rules may be evaluated by payment account issuers, various devices associated with payment processing networks, and/or merchant acquirers. Once a transaction is identified as fraudulent, the transaction may be immediately rejected, flagged for manual approval, and/or approved and logged for later review. Presently, however, systems and methods for efficiently aggregating comprehensive sets of fraud rules are not disclosed.

SUMMARY

In non-limiting aspects or embodiments, provided are computer implemented methods for the generation of a set of fraud detection rules based on historical transaction data comprising both non-fraudulent transactions and fraudulent transactions.

According to some non-limiting aspects or embodiments, the computer-implemented method may comprise receiving, with at least one processor, historical transaction data comprising a plurality of transactions associated with an issuer institution, the plurality of transactions comprising a plurality of non-fraudulent transactions and a plurality of fraudulent transactions; associating, with at least one processor, a tag with each of the transactions, the tag associated with a predetermined transaction type; generating, with at least one processor, at least one decision tree having a root node and at least one child node operably connected to the root node; determining, with at least one processor, at least one primary rule and at least one set of secondary rules associated with the at least one primary rule based on relationships between correlated features associated with the plurality of non-fraudulent transactions and the plurality of fraudulent transactions; assigning, with at least one processor, the at least one primary rule and the at least one set of secondary rules associated with the at least one primary rule to the at least one decision tree to populate the at least one decision tree; extracting, with at least one processor, a plurality of rule sets from the at least one decision tree, each of the plurality of rule sets comprising an ordered set comprising the at least one primary rule and one or more secondary rules from among the at least one set of secondary rules associated with the at least one primary rule; determining, with at least one processor, an ordering of the plurality of rule sets, the ordering based on memory-based efficiency characteristics and fraud-detection-based characteristics associated with each of the rule sets of the plurality of rule sets; and determining, with at least one processor, a subset of rule sets from the ordered plurality of rule sets against which subsequently received transactions are compared against to determine if the subsequently received transactions are non-fraudulent transactions or fraudulent transactions.

In some non-limiting aspects or embodiments, the computer-implemented method may comprise transmitting the ordering of the plurality of rule sets to a first terminal associated with an issuer system to be displayed on a display of the first terminal, receiving instructions to activate at least one selected rule set from among the ordering of the plurality of rule sets based on input received at the first terminal, and activating the at least one selected rule set.

According to some non-limiting aspects or embodiments, the computer-implemented method may comprise activating the subset of rule sets from the ordered plurality of rule sets against which subsequently received transactions are compared against, receiving a subsequently received transaction from a transaction terminal, comparing the subsequently received transaction to the activated at least one selected rule set, and transmitting an authorization message denying a transaction based on the comparison of the subsequently received transaction to the activated at least one selected rule set.

In some non-limiting aspects or embodiments, receiving historical transaction data may comprise receiving additional historical transaction data from at least one day prior to a day the historical transaction data was received. While the plurality of transactions of the historical transaction data and the additional historical transaction data combined comprise a quantity of transactions less than a predetermined amount, receiving historical transaction data may further comprise receiving historical transaction data from at least one additional day prior to the last date the historical transaction data was received at the issuer institution.

According to some non-limiting aspects or embodiments, the day the historical transaction data is received may be the day before a buffer period of days prior to the day the historical transaction data is received.

In some non-limiting aspects or embodiments, generating the at least one decision tree may comprise limiting the depth of the at least one decision tree to a predetermined depth.

According to some non-limiting aspects or embodiments, comparing the subsequently received transaction to the activated at least one selected rule set may further comprise comparing the subsequently received transaction to the activated at least one selected rule set using a two-pass analysis progression.

In some non-limiting aspects or embodiments, receiving historical transaction data associated with an issuer institution may further comprise receiving historical transaction data from a plurality of issuer institutions.

According to some non-limiting aspects or embodiments, a system for generating a set of fraud detection rules based on historical transaction data comprising both non-fraudulent transactions and fraudulent transactions is disclosed. The system may comprise at least one processor programmed or configured to: receive historical transaction data comprising a plurality of transactions associated with an issuer institution, the plurality of transactions comprising a plurality of non-fraudulent transactions and a plurality of fraudulent transactions, associate a tag with each of the transactions, the tag associated with a predetermined transaction type, generate at least one decision tree having a root node and at least one child node operably connected to the root node, determine at least one primary rule and at least one set of secondary rules associated with the at least one primary rule based on relationships between correlated features associated with the plurality of non-fraudulent transactions and the plurality of fraudulent transactions, assign the at least one primary rule and the at least one set of secondary rules associated with the at least one primary rule to the at least one decision tree to populate the at least one decision tree, extract a plurality of rule sets from the at least one decision tree, each of the plurality of rule sets comprising an ordered set comprising the at least one primary rule and one or more secondary rules from among the at least one set of secondary rules associated with the at least one primary rule, determine an ordering of the plurality of rule sets, the ordering based on memory-based efficiency characteristics and fraud-detection-based characteristics associated with each of the rule sets of the plurality of rule sets, and determine a subset of rule sets from the ordered plurality of rule sets against which subsequently received transactions are compared against to determine if the subsequently received transactions are non-fraudulent transactions or fraudulent transactions.

In some non-limiting aspects or embodiments, the at least one processor may be further programmed or configured to: transmit the ordering of the plurality of rule sets to a first terminal associated with an issuer system to be displayed on a display of the first terminal, receive instructions to activate at least one selected rule set from among the ordering of the plurality of rule sets based on input received at the first terminal, and activate the at least one selected rule set.

According to some non-limiting aspects or embodiments, the at least one processor may be further programmed or configured to: activate the subset of rule sets from the ordered plurality of rule sets against which subsequently received transactions are compared against, receive a subsequently received transaction from a transaction terminal, compare the subsequently received transaction to the activated at least one selected rule set, and transmit an authorization message denying a transaction based on the comparison of the subsequently received transaction to the activated at least one selected rule set.

In some non-limiting aspects or embodiments, when receiving historical transaction data, the at least one processor may be programmed or configured to receive additional historical transaction data from at least a day prior to a day the historical transaction data is received. According to some non-limiting aspects or embodiments, while the plurality of transactions of the historical transaction data and the additional historical transaction data combined comprises a quantity of transactions less than a predetermined amount, when receiving historical transaction data the at least one processor may be programmed or configured to receive historical transaction data from at least one additional day prior to the last date the historical transaction data was received at the issuer institution.

According to some non-limiting aspects or embodiments, the day the historical transaction data is received may be the day before a buffer period of days prior to the day the historical transaction data is received.

In some non-limiting aspects or embodiments, when generating the at least one decision tree, the at least one processor is programmed or configured to limit the depth of the at least one decision tree to a predetermined depth.

According to some non-limiting aspects or embodiments, when comparing the subsequently received transaction to the activated at least one selected rule set, the at least one processor may be further programmed or configured to compare the subsequently received transaction to the activated at least one selected rule set using a two-pass analysis progression.

In some non-limiting aspects or embodiments, when receiving historical transaction data associated with an issuer institution, the at least one processor is programmed or configured to receive historical transaction data from a plurality of issuer institutions.

According to some non-limiting aspects or embodiments of the present disclosure, a computer program product for generating a set of fraud detection rules based on historical transaction data comprising both non-fraudulent transactions and fraudulent transactions is disclosed.

In some non-limiting aspects or embodiments, the computer program product comprises at least one non-transitory computer readable medium comprising one or more instructions that, when executed by the at least one processor, cause the at least one processor to: receive historical transaction data comprising a plurality of transactions associated with an issuer institution, the plurality of transactions comprising a plurality of non-fraudulent transactions and a plurality of fraudulent transactions, associate a tag with each of the transactions, the tag associated with a predetermined transaction type, generate at least one decision tree having a root node and at least one child node operably connected to the root node, determine at least one primary rule and at least one set of secondary rules associated with the at least one primary rule based on relationships between correlated features associated with the plurality of non-fraudulent transactions and the plurality of fraudulent transactions, assign the at least one primary rule and the at least one set of secondary rules associated with the at least one primary rule to the at least one decision tree to populate the at least one decision tree, extract a plurality of rule sets from the at least one decision tree, each of the plurality of rule sets comprising an ordered set comprising the at least one primary rule and one or more secondary rules from among the at least one set of secondary rules associated with the at least one primary rule, determine an ordering of the plurality of rule sets, the ordering based on memory-based efficiency characteristics and fraud-detection-based characteristics associated with each of the rule sets of the plurality of rule sets, and determine a subset of rule sets from the ordered plurality of rule sets against which subsequently received transactions are compared against to determine if the subsequently received transactions are non-fraudulent transactions or fraudulent transactions.

According to some non-limiting aspects or embodiments, the one or more instructions, when executed by the at least one processor, further cause the at least one processor to: transmit the ordering of the plurality of rule sets to a first terminal associated with an issuer system to be displayed on a display of the first terminal, receive instructions to activate at least one selected rule set from among the ordering of the plurality of rule sets based on input received at the first terminal, and activate the at least one selected rule set.

In some non-limiting aspects or embodiments, the one or more instructions, when executed by the at least one processor, further cause the at least one processor to: activate the subset of rule sets from the ordered plurality of rule sets against which subsequently received transactions are compared against, receive a subsequently received transaction from a transaction terminal, compare the subsequently received transaction to the activated at least one selected rule set, and transmit an authorization message denying a transaction based on the comparison of the subsequently received transaction to the activated at least one selected rule set.

According to some non-limiting aspects or embodiments, the one or more instructions that cause the at least one processor to receive historical transaction data comprises receiving additional historical transaction data from at least a day prior to a day the historical transaction data is received. While the plurality of transactions of the historical transaction data and the additional historical transaction data combined comprises a quantity of transactions less than a predetermined amount, the one or more instructions that cause the at least one processor to receive historical transaction data may cause the at least one processor to receive historical transaction data that may further comprise historical transaction data from at least one additional day prior to the last date the historical transaction data was received at the issuer institution.

In some non-limiting aspects or embodiments, the day the historical transaction data is received may be the day before a buffer period of days prior to the day the historical transaction data is received.

According to some non-limiting aspects or embodiments, the one or more instructions that cause the at least one processor to generate the at least one decision tree may cause the at least one processor to limit the depth of the at least one decision tree to a predetermined depth.

In some non-limiting aspects or embodiments, the one or more instructions that cause the at least one processor to compare the subsequently received transaction to the activated at least one selected rule set, may further cause the at least one processor to compare the subsequently received transaction to the activated at least one selected rule set using a two-pass analysis progression.

According to some non-limiting aspects or embodiments, the one or more instructions that cause the at least one processor to receive historical transaction data associated with an issuer institution may cause the at least one processor to receive historical transaction data from a plurality of issuer institutions.

Clause 1: A computer-implemented method for generating a set of fraud detection rules based on historical transaction data comprising both non-fraudulent transactions and fraudulent transactions, the computer-implemented method comprising: receiving, with at least one processor, historical transaction data comprising a plurality of transactions associated with an issuer institution, the plurality of transactions comprising a plurality of non-fraudulent transactions and a plurality of fraudulent transactions; associating, with at least one processor, a tag with each of the transactions, the tag associated with a predetermined transaction type; generating, with at least one processor, at least one decision tree having a root node and at least one child node operably connected to the root node; determining, with at least one processor, at least one primary rule and at least one set of secondary rules associated with the at least one primary rule based on relationships between correlated features associated with the plurality of non-fraudulent transactions and the plurality of fraudulent transactions; assigning, with at least one processor, the at least one primary rule and the at least one set of secondary rules associated with the at least one primary rule to the at least one decision tree to populate the at least one decision tree; extracting, with at least one processor, a plurality of rule sets from the at least one decision tree, each of the plurality of rule sets comprising an ordered set comprising the at least one primary rule and one or more secondary rules from among the at least one set of secondary rules associated with the at least one primary rule; determining, with at least one processor, an ordering of the plurality of rule sets, the ordering based on memory-based efficiency characteristics and fraud-detection-based characteristics associated with each of the rule sets of the plurality of rule sets; and determining, with at least one processor, a subset of rule sets from the ordered plurality of rule sets against which subsequently received transactions are compared against to determine if the subsequently received transactions are non-fraudulent transactions or fraudulent transactions.

Clause 2: The computer-implemented method according to clause 1, further comprising: transmitting the ordering of the plurality of rule sets to a first terminal associated with an issuer system to be displayed on a display of the first terminal; receiving instructions to activate at least one selected rule set from among the ordering of the plurality of rule sets based on input received at the first terminal; and activating the at least one selected rule set.

Clause 3: The computer-implemented method according to clauses 1 or 2, further comprising: activating the subset of rule sets from the ordered plurality of rule sets against which subsequently received transactions are compared against; receiving a subsequently received transaction from a transaction terminal; comparing the subsequently received transaction to the activated at least one selected rule set; and transmitting an authorization message denying a transaction based on the comparison of the subsequently received transaction to the activated at least one selected rule set.

Clause 4: The computer-implemented method according to any of clauses 1-3, wherein receiving historical transaction data comprises receiving additional historical transaction data from at least a day prior to a day the historical transaction data is received, wherein while the plurality of transactions of the historical transaction data and the additional historical transaction data combined comprises a quantity of transactions less than a predetermined amount, receiving historical transaction data further comprises receiving historical transaction data from at least one additional day prior to the last date the historical transaction data was received at the issuer institution.

Clause 5: The computer-implemented method according to any of clauses 1-4, wherein the day the historical transaction data is received is the day before a buffer period of days prior to the day the historical transaction data is received.

Clause 6: The computer-implemented method according to any of clauses 1-5, wherein generating the at least one decision tree comprises limiting the depth of the at least one decision tree to a predetermined depth.

Clause 7: The computer-implemented method according to any of clauses 1-6, wherein comparing the subsequently received transaction to the activated at least one selected rule further comprises comparing the subsequently received transaction to the activated at least one selected rule set using a two-pass analysis progression.

Clause 8: The computer-implemented method according to any of clauses 1-7, wherein receiving historical transaction data associated with an issuer institution comprises receiving historical transaction data from a plurality of issuer institutions.

Clause 9: A system for generating a set of fraud detection rules based on historical transaction data comprising both non-fraudulent transactions and fraudulent transactions comprising at least one processor programmed or configured to: receive historical transaction data comprising a plurality of transactions associated with an issuer institution, the plurality of transactions comprising a plurality of non-fraudulent transactions and a plurality of fraudulent transactions; associate a tag with each of the transactions, the tag associated with a predetermined transaction type; generate at least one decision tree having a root node and at least one child node operably connected to the root node; determine at least one primary rule and at least one set of secondary rules associated with the at least one primary rule based on relationships between correlated features associated with the plurality of non-fraudulent transactions and the plurality of fraudulent transactions; assign the at least one primary rule and the at least one set of secondary rules associated with the at least one primary rule to the at least one decision tree to populate the at least one decision tree; extract a plurality of rule sets from the at least one decision tree, each of the plurality of rule sets comprising an ordered set comprising the at least one primary rule and one or more secondary rules from among the at least one set of secondary rules associated with the at least one primary rule; determine an ordering of the plurality of rule sets, the ordering based on memory-based efficiency characteristics and fraud-detection-based characteristics associated with each of the rule sets of the plurality of rule sets; and determine a subset of rule sets from the ordered plurality of rule sets against which subsequently received transactions are compared against to determine if the subsequently received transactions are non-fraudulent transactions or fraudulent transactions.

Clause 10: The system according to clause 9, wherein the at least one processor is further programmed or configured to: transmit the ordering of the plurality of rule sets to a first terminal associated with an issuer system to be displayed on a display of the first terminal; receive instructions to activate at least one selected rule set from among the ordering of the plurality of rule sets based on input received at the first terminal; and activate the at least one selected rule set.

Clause 11: The system according to clauses 9 or 10, wherein the at least one processor is further programmed or configured to: activate the subset of rule sets from the ordered plurality of rule sets against which subsequently received transactions are compared against; receive a subsequently received transaction from a transaction terminal; compare the subsequently received transaction to the activated at least one selected rule set; and transmit an authorization message denying a transaction based on the comparison of the subsequently received transaction to the activated at least one selected rule set.

Clause 12: The system according to any of clauses 9-11, wherein when receiving historical transaction data the at least one processor is programmed or configured to: receive additional historical transaction data from at least a day prior to a day the historical transaction data is received, and while the plurality of transactions of the historical transaction data and the additional historical transaction data combined comprises a quantity of transactions less than a predetermined amount, when receiving historical transaction data the at least one processor is programmed or configured to receive historical transaction data from at least one additional day prior to the last date the historical transaction data was received at the issuer institution.

Clause 13: The system according to any of clauses 9-12, wherein the day the historical transaction data is received is the day before a buffer period of days prior to the day the historical transaction data is received.

Clause 14: The system according to any of clauses 9-13, wherein when generating the at least one decision tree comprises limiting the depth of the at least one decision tree to a predetermined depth.

Clause 15: The system according to any of clauses 9-14, wherein when comparing the subsequently received transaction to the activated at least one selected rule set, the at least one processor is programmed or configured to compare the subsequently received transaction to the activated at least one selected rule set using a two-pass analysis progression.

Clause 16: The system according to any of clauses 9-15, wherein, when receiving historical transaction data associated with an issuer institution, the at least one processor is programmed or configured to receive historical transaction data from a plurality of issuer institutions.

Clause 17: A computer program product for generating a set of fraud detection rules based on historical transaction data comprising both non-fraudulent transactions and fraudulent transactions, comprising at least one non-transitory computer readable medium comprising one or more instructions that, when executed by at least one processor, cause the at least one processor to: receive historical transaction data comprising a plurality of transactions associated with an issuer institution, the plurality of transactions comprising a plurality of non-fraudulent transactions and a plurality of fraudulent transactions; associate a tag with each of the transactions, the tag associated with a predetermined transaction type; generate at least one decision tree having a root node and at least one child node operably connected to the root node; determine at least one primary rule and at least one set of secondary rules associated with the at least one primary rule based on relationships between correlated features associated with the plurality of non-fraudulent transactions and the plurality of fraudulent transactions; assign the at least one primary rule and the at least one set of secondary rules associated with the at least one primary rule to the at least one decision tree to populate the at least one decision tree; extract a plurality of rule sets from the at least one decision tree, each of the plurality of rule sets comprising an ordered set comprising the at least one primary rule and one or more secondary rules from among the at least one set of secondary rules associated with the at least one primary rule; determine an ordering of the plurality of rule sets, the ordering based on memory-based efficiency characteristics and fraud-detection-based characteristics associated with each of the rule sets of the plurality of rule sets; and determine a subset of rule sets from the ordered plurality of rule sets against which subsequently received transactions are compared against to determine if the subsequently received transactions are non-fraudulent transactions or fraudulent transactions.

Clause 18: The computer program product according to clause 17, wherein the one or more instructions, when executed by the at least one processor, further cause the at least one processor to: transmit the ordering of the plurality of rule sets to a first terminal associated with an issuer system to be displayed on a display of the first terminal; receive instructions to activate at least one selected rule set from among the ordering of the plurality of rule sets based on input received at the first terminal; and activate the at least one selected rule set.

Clause 19: The computer program product according to clauses 17 or 18, wherein the one or more instructions, when executed by the at least one processor, further cause the at least one processor to: activate the subset of rule sets from the ordered plurality of rule sets against which subsequently received transactions are compared against; receive a subsequently received transaction from a transaction terminal; compare the subsequently received transaction to the activated at least one selected rule set; and transmit an authorization message denying a transaction based on the comparison of the subsequently received transaction to the activated at least one selected rule set.

Clause 20: The computer program product according to any of clauses 17-19, wherein the one or more instructions that cause the at least one processor to receive historical transaction data cause the at least one processor to receive additional historical transaction data from at least a day prior to a day the historical transaction data is received, wherein, while the plurality of transactions of the historical transaction data and the additional historical transaction data combined comprises a quantity of transactions less than a predetermined amount, the one or more instructions that cause the at least one processor to receive historical transaction data cause the at least one processor to receive historical transaction data further comprises receiving historical transaction data from at least one additional day prior to the last date the historical transaction data was received at the issuer institution.

Clause 21: The computer program product according to any of clauses 17-20, wherein the day the historical transaction data is received is the day before a buffer period of days prior to the day the historical transaction data is received.

Clause 22: The computer program product according to any of clauses 17-21, wherein the one or more instructions that cause the at least one processor to generate the at least one decision tree cause the at least one processor to limit the depth of the at least one decision tree to a predetermined depth.

Clause 23: The computer program product according to any of clauses 17-22, wherein the one or more instructions that cause the at least one processor to compare the subsequently received transaction to the activated at least one selected rule set cause the at least one processor to compare the subsequently received transaction to the activated at least one selected rule set using a two-pass analysis progression.

Clause 24: The computer program product according to any of clauses 17-23, wherein the one or more instructions that cause the at least one processor to receive historical transaction data associated with an issuer institution causes the at least one processor to receive historical transaction data from a plurality of issuer institutions.

BRIEF DESCRIPTION OF THE DRAWINGS

Additional advantages and details are explained in greater detail below with reference to the non-limiting aspects or embodiments illustrated in the accompanying schematic figures, in which:

FIG. 4 is a diagram of an implementation of a non-limiting aspect or embodiment of a process shown in FIG. 3.

DETAILED DESCRIPTION

Figure 1:
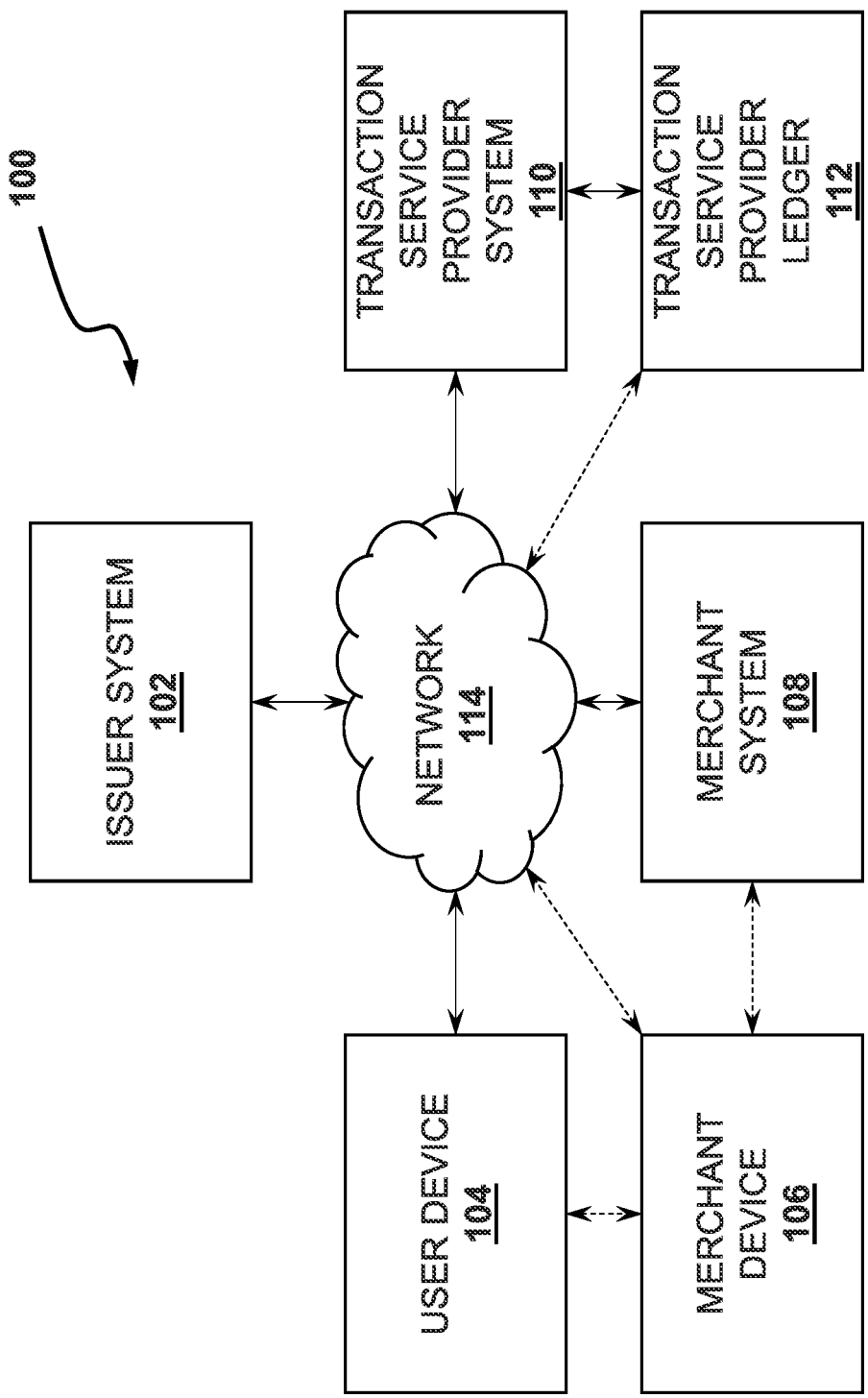
FIG. 1 is a schematic diagram of a system for generating a set of fraud detection rules based on historical transaction data including both non-fraudulent transactions and fraudulent transactions.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the illustrated embodiments are not to be interpreted as limiting and may assume various alternative variations and step sequences, except where expressly specified to the contrary. It is also to be understood that the specific devices and processes illustrated in the attached drawings, and described in the following specification, are simply exemplary embodiments or aspects of the present disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the term "communicate" may refer to the reception, receipt, transmission, transfer, provision, and/or the like of information (e.g., data, signals, messages, instructions, commands, and/or the like). As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. As another example, a first unit may communicate with a second unit if an intermediary unit (e.g., a third unit located between the first unit and the second unit) receives information from the first unit, processes the information received from the first unit to produce processed information, and communicates the processed information to the second unit. In some non-limiting embodiments, a message may refer to a packet (e.g., a data packet, a network packet, and/or the like) that includes data.

As used herein, the term "transaction service provider" may refer to an entity that receives transaction authorization requests from merchants or other entities and provides guarantees of payment, in some cases through an agreement between the transaction service provider and an issuer. For example, a transaction service provider may include a payment network, such as Visa®, MasterCard®, American Express®, or any other entity that processes transactions. As used herein "transaction service provider system" may refer to one or more systems operated by or operated on behalf of a transaction service provider, such as a transaction service provider system executing one or more software applications associated with the transaction service provider. In some non-limiting embodiments, a transaction service provider system may include one or more servers operated by or operated on behalf of a transaction service provider.

As used herein, the term "issuer" may refer to one or more entities that provide one or more accounts (e.g., a credit account, a debit account, a credit card account, a debit card account, and/or the like) to a user (e.g., customer, consumer, and/or the like) for conducting transactions (e.g., payment transactions). For example, an issuer may provide an account identifier, such as a personal account number (PAN), an international bank account number (IBAN), and/or the like to a user that uniquely identifies one or more accounts associated with the user. The account identifier may be used by the user to conduct a payment transaction. In some non-limiting embodiments, the account identifier may be embodied on a portable financial device, such as a physical financial instrument (e.g., a payment card) and/or may be electronic and used for electronic payments. In some non-limiting embodiments, an issuer may be associated with a bank identification number (BIN) that uniquely identifies the issuer. As used herein "issuer system" may refer to one or more systems operated by or operated on behalf of an issuer. For example, an issuer system may refer to a server executing one or more software applications associated with the issuer. In some non-limiting embodiments, an issuer system may include one or more servers (e.g., one or more authorization servers) for authorizing a payment transaction.

As used herein, the term "merchant" may refer to one or more entities (e.g., one or more operators of retail businesses, one or more retailers, and/or the like) that provide goods and/or services to a user based on a payment transaction between the one or more entities and the user. As used herein "merchant system" may refer to one or more systems operated by or operated on behalf of a merchant, such as a server executing one or more software applications associated with the merchant.

As used herein, the term "account identifier" may refer to one or more types of identifiers associated with an account (e.g., a unique identifier of an account, an account number, a PAN, a card number, a payment card number, a token, and/or the like) of a user. In some non-limiting embodiments, an issuer may provide an account identifier to a user that uniquely identifies one or more accounts associated with that user. In some non-limiting embodiments, an account identifier may be embodied on a physical financial instrument (e.g., a portable financial device, a payment card, a credit card, a debit card, and/or the like) and/or may be electronic information communicated to the user that the user may use for electronic payment transactions. In some non-limiting embodiments, an account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten by the user, stolen from the user, and/or the like, a supplemental account identifier may be provided to the user. In some non-limiting embodiments, an account identifier may be directly or indirectly associated with an issuer such that an account identifier may be a token that maps to a PAN or other type of identifier. Account identifiers may be alphanumeric, any combination of characters and/or symbols, and/or the like.

As used herein, the term "account token" may refer to an identifier that is used as a substitute or replacement identifier for an account identifier, such as a PAN. An account token may be used as a substitute or replacement identifier for an original account identifier, such as a PAN. Account tokens may be associated with a PAN or other original account identifier in one or more data structures (e.g., one or more databases and/or the like) such that they may be used to conduct a transaction without directly using the original account identifier. In some non-limiting embodiments, an original account identifier, such as a PAN, may be associated with a plurality of account tokens for different individuals or purposes. In some non-limiting embodiments, account tokens may be associated with a PAN or other account identifiers in one or more data structures such that they can be used to conduct a transaction without directly using the account identifier, such as a PAN. In some examples, an account identifier, such as a PAN, may be associated with a plurality of account tokens for different uses or different purposes.

As used herein, the term "computing device" may refer to one or more electronic devices that include one or more processors and/or integrated circuits. A computing device may be a stationary computer or a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also include components to send, receive, and/or process data such as, but not limited to, memory, a display device, an input device, a network interface, and/or the like.

As used herein, the term "payment device" may refer to an electronic payment device, a portable financial device, a portable financial payment instrument, a payment card, such as a credit card, a debit card, a charge card, a gift card, a smartcard, a payroll card, and/or the like, associated with an account identifier of a payment account. In some non-limiting embodiments, the payment device may include volatile and/or non-volatile memory to store information (e.g., an account identifier, a name of the account holder, and/or the like). A payment device may also include a mobile device having an electronic wallet thereon.

As used herein, the term "server" may refer to or include one or more processors or computing devices, storage devices, or similar computer arrangements that are operated by or facilitate communication and processing for multiple parties in a network environment, such as the Internet, although it will be appreciated that communication may be facilitated over one or more public or private network environments and that various other arrangements are possible. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or processor recited as performing a second step or function.

As used herein, the term "system" may refer to one or more devices, such as one or more processors, servers, and/or computing devices that include software applications, and/or the like.

Fraud rules are widely utilized. For example, U.S. Patent Application Publication Nos. 2013/0346294 and 2016/0292690, assigned to the assignee of the present disclosure, the disclosures of which are incorporated herein by reference in their entireties, disclose systems and methods for automatically generating fraud rules. However, conventional processes for defining fraud rules may require significant human expertise and effort and/or significant memory usage and processor run time. For example, conventional processes for determining fraud rules may not be scalable and/or may be based on relatively few parameters (e.g., transaction parameters or attributes, consumer parameters or attributes, merchant parameters or attributes, etc.). Further, in view of ever-increasing threats to transaction security and the increased diversity of transactions being performed as travel becomes more prevalent, there is a growing need for systems and methods of identifying efficient fraud rules that are capable of detecting a wider variety of fraudulent transactions, as well as for more robust fraud rules that improve overfitting.

Accordingly, provided are systems and methods for generating a set of fraud detection rules or rule sets based on historical transaction data including both non-fraudulent transactions and fraudulent transactions. These systems and methods may include receiving historical transaction data including a plurality of transactions associated with an issuer institution, the plurality of transactions including a plurality of non-fraudulent transactions and a plurality of fraudulent transactions; associating a tag with each of the transactions, the tag associated with a predetermined transaction type; generating at least one decision tree having a root node and at least one child node operably connected to the root node; determining at least one primary rule and at least one set of secondary rules associated with the at least one primary rule based on relationships between correlated features associated with the plurality of non-fraudulent transactions and the plurality of fraudulent transactions; assigning the at least one primary rule and the at least one set of secondary rules associated with the at least one primary rule to the at least one decision tree to populate the at least one decision tree; extracting a plurality of rule sets from the at least one decision tree, each of the plurality of rule sets including an ordered set including the at least one primary rule and one or more secondary rules from among the at least one set of secondary rules associated with the at least one primary rule; determining an ordering of the plurality of rule sets, the ordering based on memory-based efficiency characteristics and fraud-detection-based characteristics associated with each of the rule sets of the plurality of rule sets; and determining a subset of rule sets from the ordered plurality of rule sets against which subsequently received transactions are compared against to determine if the subsequently received transactions are non-fraudulent transactions or fraudulent transactions.

By virtue of the above-noted features, systems may be developed which, by implementing principles of the present disclosure, are able to generate comprehensive and targeted rule sets based on both the known, non-fraudulent, transactions and/or the known, fraudulent, transactions. These systems and methods address particular challenges associated with comparing large numbers of transactions (e.g., transactions for an issuer with an issuer maintaining a large amount of accounts) to rule sets. Specifically, as rule sets increase in size (e.g., as more rules are added to a given rule set), comparing large numbers of transactions to these rule sets require increasing amounts of memory and or processor cycles. As a result, these systems and methods may require additional computing resources to keep up with transactions received throughout a given period.

According to some non-limiting embodiments described herein, at the outset, rule sets may be generated based on one or more identifiable factors (e.g., whether transactions occur at certain times during the day, whether the transactions occur in a particular location, and/or the like). The rule sets may then be analyzed, and sub-rule sets therefrom selected that efficiency and accurately identify non-fraudulent and fraudulent transaction data. Transactions may then be analyzed in real time using the selected sub-rule sets to identify potentially fraudulent transactions for either additional scrutiny or authorization denial. In this way, by more accurately identifying fraudulent transactions in a targeted manner with these sub-rule sets, transaction processing times may be reduced, freeing system resources to process subsequent transactions and/or analyze suspect transactions in greater detail. Additionally, or alternatively, rule sets (either the rule sets selected at the outset and/or the selected rule sets) may be ordered and transactions compared in a two-pass approach where, if a rule triggers a fraud warning when compared to a first sub-rule set, the transactions may then be segregated and compared to a second sub-rule set to determine whether the transaction is fraudulent. As a result, not every transaction need be compared to every rule in a given rule set to be authorized, thereby reducing the number of computations needed to determine whether a transaction is or is not fraudulent.

Referring now to FIG. 1, a system 100 for generating a set of fraud detection rules based on historical transaction data including both non-fraudulent transactions and fraudulent transactions is shown according to some non-limiting aspects or embodiments. The system 100 includes an issuer system 102, a user device 104, a merchant device 106, a merchant system 108, a transaction service provider system 110, and a transaction service provider ledger 112. The issuer system 102, user device 104, merchant device 106, merchant system 108, transaction service provider system 110, and/or transaction service provider ledger 112 may interconnect (e.g., establish a connection to directly or operably communicate) via wired connections, wireless connections, or a combination of wired and wireless connections, to any or all of the corresponding components of the system 100. In some non-limiting embodiments, operable communication may be established between the devices of the system 100 by communicating via an intermediate device or system.

With continued reference to FIG. 1, the issuer system 102 may include one or more devices capable of communicating and/or receiving information to and/or from the user device 104, merchant device 106, merchant system 108, transaction service provider system 110, and/or transaction service provider ledger 112 via the network 114. For example, the issuer system 102 may include one or more computing devices, such as a server (e.g., a transaction processing server), a group of servers, and/or other similar devices. In some non-limiting embodiments, the issuer system 102 may be associated with an issuer institution that issued a credit account, debit account, credit card, debit card, and/or the like to a user associated with the user device 104.

The user device 104 may include one or more devices capable of communicating information to and/or from the issuer system 102, merchant device 106, merchant system 108, transaction service provider system 110 and/or transaction service provider ledger 112 via the network 114. For example, the user device 104 may include a payment device, one or more computing devices, and/or any other system or device configured to initiate and/or participate in a transaction. In some non-limiting embodiments, the user device 104 may interconnect (e.g., establish a connection to communicate) with the merchant device 106 and/or the merchant system 108 via wired connections, wireless connections, or a combination of wired and wireless connections. In some non-limiting embodiments, the user device 104 may be part of the merchant device 106 and/or the merchant system 108, such as one or more components of a point-of-sale (POS) system. In some non-limiting embodiments, the user device 104 may be capable of receiving information (e.g., from the merchant device 106, the merchant system 108, and/or the transaction service provider system 110, etc.) via a short range wireless communication connection (e.g., a NFC connection, a radio frequency identification (RFID) communication connection, a Bluetooth® communication connection, and/or the like) or any other form of communication (e.g., a communication routed through a hub or server), or any other form of communication. The user device 104 may be associated with a party to a transaction such as an individual or entity associated with a credit account, debit account, credit card, debit card, and/or the like.

The merchant device 106 may include one or more devices capable of communicating information to and/or from the issuer system 102, user device 104, merchant system 108, transaction service provider system 110 and/or transaction service provider ledger 112 via the network 114 and/or via a local connection (e.g., a short range wireless communication connection such as a NFC connection, a RFID communication connection, a Bluetooth® communication connection, and/or the like). For example, the merchant device 106 may include a physical device, one or more computing devices, portable computers, tablet computers, cellular phones, smartphones, wearable devices (e.g., watches, glasses, lenses, clothing and/or the like), PDAs, and/or the like. In some non-limiting embodiments, merchant device 106 may include an antenna configured to receive and/or transmit data via an NFC connection, a memory, and an IC in communication with the antenna and the IC. In some non-limiting embodiments the memory associated with the IC and the antenna may be associated with a portion of memory in communication with a processor of such devices, or may be partially or completely segregated from the memory and/or the processor of such devices. The merchant device 106 may interconnect (e.g., establish a connection to communicate) with the merchant system 108 via wired connections, wireless connections, or a combination of wired and wireless connections. In some non-limiting embodiments, the merchant device 106 may be capable of transmitting and/or receiving information (e.g., from the user device 104 and/or the merchant system 108) via a short range wireless communication connection (e.g., NFC connection, a RFID communication connection, a Bluetooth® communication connection, and/or the like) and/or communicating information (e.g., to the user device 104 and/or the merchant system 108) via a short range wireless communication connection.

The merchant system 108 may include one or more systems or devices capable of communicating information to and/or from the issuer system 102, user device 104, merchant device 106, transaction service provider system 110, and transaction service provider ledger 112 via the network 114. For example, the merchant system 108 may include one or more computing devices, such as one or more servers, one or more POS systems, and/or other like systems or devices. In some non-limiting embodiments, the merchant system 108 may include a device capable of communicating and/or receiving information from the user device 104 and/or the merchant device 106 via a network (e.g., the network 114) and/or a wireless communication connection (e.g., a NFC connection, a RFID communication connection, a Bluetooth® communication connection, and/or the like). In some non-limiting embodiments, the merchant system 108 may include one or more merchant devices 106 and/or user devices 104. For example, the merchant system 108 may include user device 104 and/or merchant device 106 that allow a merchant to communicate information to the transaction service provider system 110 and/or the transaction service provider ledger 112. In some non-limiting embodiments, the merchant system 108 may communicate with the transaction service provider system 110 to process a transaction and, more particularly, initiate a transaction by transmitting a transaction authorization request generated during a transaction to the transaction service provider system 110. In some non-limiting embodiments, the merchant system 108 may communicate transaction data to the transaction service provider system 110, including transaction parameters associated with transactions initiated by the user device 104. Non-limiting examples of transaction parameters include a personal account number (PAN), a transaction amount, a transaction date and/or time, a conversion rate of currency, a merchant type, a merchant identification number, a type of currency, and/or the like. The merchant system 108 may receive a response code from the transaction service provider system 110 including an indication that the transaction is approved and/or disapproved, stolen, not to be honored, partially approved, is for an amount exceeding a maximum permitted amount, is associated with an account having insufficient funds, included an incorrect PIN, and/or the like. In some non-limiting embodiments, the transaction parameters may be stored in a database (e.g., the transaction service provider ledger 112) associated with the merchant system 108 and/or the transaction service provider system 110. In some non-limiting embodiments, the merchant system 108 may include one or more devices, such as computers, computing devices, computer systems, and/or peripheral devices capable of being used by a merchant to conduct a payment transaction with a user.

The transaction service provider system 110 may include one or more devices capable of communicating information to and/or from the issuer system 102, user device 104, merchant device 106, merchant system 108, and transaction service provider ledger 112 via the network 114. For example, the transaction service provider system 110 may include one or more computing devices, such as a server, a group of servers, and/or other like devices. In some non-limiting embodiments, the transaction service provider system 110 may be associated with a financial institution (e.g., an issuer institution) and/or a transaction service provider as described herein. The transaction service provider system 110 may include data processing subsystems, networks, and/or operations used to support and deliver certificate authority services, authorization services, exception file services, and clearing and settlement services. An example of a transaction service provider systems 110 that may implement some or all of the features include VisaNet™. Transaction service provider systems 110, such as VisaNet™, may be configured to process credit card transactions, debit card transactions, and other types of commercial transactions. VisaNet™, in particular, includes a VIP system (Visa Integrated Payments system) which processes authorization requests and a Base II system which performs clearing and settlement services. At the end of a business day, a clearing and settlement process may be conducted by the transaction service provider system 110 to exchange financial details between the merchant system 108, the transaction service provider system 110, and/or the issuer system 102. As a result of the clearing and settlement process, payments made from accounts maintained either by the issuer system 102 and/or the transaction service provider system 110 may be reconciled.

In some non-limiting aspects or embodiments, the transaction service provider system 110 may acquire or otherwise maintain historical transaction data (e.g., transaction data, authorization data, fraud data, and/or the like) to determine or create rules that target various identified fraud patterns occurring in transactions associated with the issuer and/or other account-maintaining entities. For example, an issuer (e.g., via the issuer system 102, transaction service provider system 110, etc.) may review, edit, test, and/or make decisions regarding activation or deactivation of determined rules. In some non-limiting embodiments, the transaction service provider system 110 may include a first component (e.g., a first computer) configured to schedule a rule determination process, provide a user interface to issuers for reviewing, editing, and/or activating determined rules, and transmit the activated rules to the issuer system 102 for deployment. The transaction service provider system 110 may include a second component (e.g., a second computer) configured to connect a Hadoop cluster to pull transaction data, perform the rule determination process in Spark, output job run log files to Splunk, and deliver determined rules to the user interface of the first component.

The transaction service provider ledger 112 may include one or more devices capable of communicating information to and/or from the issuer system 102, user device 104, merchant device 106, merchant system 108, and transaction service provider system 110 via the network 114. For example, the transaction service provider ledger 112 may include one or more computing devices, such as a server, a group of servers, and/or other like devices. In some non-limiting embodiments, the transaction service provider ledger 112 may be associated with a financial institution (e.g., an issuer institution) and/or a transaction service provider as described herein. In some non-limiting embodiments, the transaction service provider ledger 112 may be configured to communicate solely through the transaction service provider system 110, the issuer system 102, and/or the merchant system 108.

The network 114 may include one or more wired and/or wireless networks. For example, the network 114 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of systems, devices, and networks illustrated by FIG. 1 are provided as an example. There may be additional devices, systems, and/or networks, fewer devices, systems, and/or networks, different devices, systems, and/or networks, or differently arranged devices, systems, and/or networks than those shown in FIG. 1. Furthermore, two or more devices or systems shown in FIG. 1 may be implemented within a single device or system, or a single device or system shown in FIG. 1 may be implemented as multiple, distributed devices or systems. Additionally, or alternatively, a set of devices or systems (e.g., one or more devices or systems) of the system 100 for exchanging the transaction information when connections to a transaction service provider are unavailable may perform one or more functions described as being performed by another set of devices or systems of the system 100.

Figure 2:
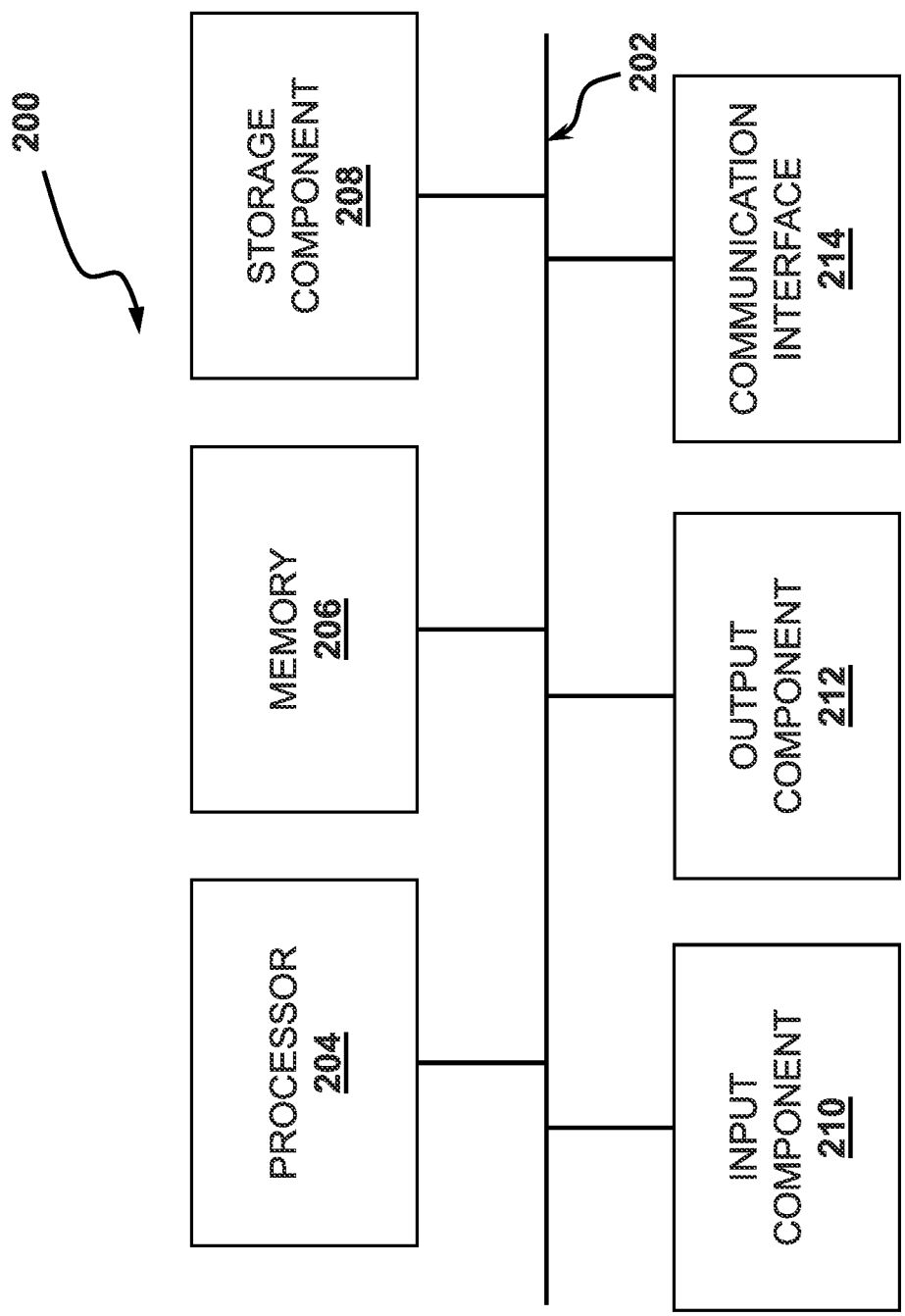
FIG. 2 is a diagram of a non-limiting embodiment of components of one or more devices of FIG. 1.

Referring now to FIG. 2, illustrated is a diagram of a computing device 200 having multiple components. The components described with regard to computing device 200 may correspond, all or in part, to components of one or more devices associated with the issuer system 102, user device 104, merchant device 106, merchant system 108, transaction service provider system 110, and transaction service provider ledger 112. In some non-limiting embodiments, the issuer system 102, user device 104, merchant device 106, merchant system 108, transaction service provider system 110, and transaction service provider ledger 112 may include at least one computing device 200 and/or one or more components of the computing device 200. As illustrated by FIG. 2, the computing device 200 may include a bus 202, a processor 204, memory 206, a storage component 208, an input component 210, an output component 212, and a communication interface 214.

The bus 202 may include a component that permits communication between the components of the computing device 200. In some non-limiting embodiments, the processor 204 may be implemented in hardware, firmware, or a combination of hardware and software. For example, the processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA) and/or an application-specific integrated circuit (ASIC), etc.) that can be programmed to perform one or more functions. The memory 206 may include random access memory (RAM), read-only memory (ROM), and/or another type of dynamic or static storage device (e.g., flash memory, magnetic memory, optical memory, etc.) that stores information and/or instructions for use and/or execution on the processor 204.

The storage component 208 may store information and/or software (e.g., executable instructions) related to the operation and use of the computing device 200. For example, the storage component 208 may include a hard disk (e.g., a magnetic disk, an optical disk, a magneto-optic disk, a solid state disk, etc.), a compact disk (CD), a digital versatile disc (DVD), a floppy disk, a cartridge, a magnetic tape, and/or another type of computer-readable medium, along with a corresponding drive.

The input component 210 may include a component that permits the computing device 200 to receive information, such as via user input (e.g., a touch screen display, a keyboard, a keypad, a mouse, a button, a switch, a microphone, etc.). Additionally, or alternatively, the input component 210 may include a sensor for sensing information (e.g., a global positioning system (GPS) component, an accelerometer, a gyroscope, an actuator, etc.). The output component 212 may include a speaker, one or more light-emitting diodes (LEDs), etc.

The communication interface 214 may include a transceiver-like component (e.g., a transceiver, a separate receiver and transmitter, etc.) that enables the computing device 200 to communicate with other devices, such as via wired connections, wireless connections, or a combination of wired and wireless connections. The communication interface 214 may enable the computing device 200 to receive information from another device and/or provide information to another device. For example, the communication interface 214 may include an Ethernet interface, an optical interface, a coaxial interface, an infrared interface, a radio frequency (RF) interface, a universal serial bus (USB) interface, a Wi-Fi® interface, an NFC interface, a cellular network interface, and/or the like.

The computing device 200 may perform one or more processes described herein. For example, the computing device 200 may perform processes by executing software instructions on the processor 204. The software instructions may be stored in a computer-readable medium, such as memory 206 and/or the storage component 208. A computer-readable medium (e.g., a non-transitory computer-readable medium) is defined herein as a non-transitory memory device. A memory device includes memory space located inside of a single physical storage device or memory space spread across multiple physical storage devices.

The software instructions may be read into memory 206 and/or the storage component 208 from another computer-readable medium from another device via the communication interface 214. When executed, the software instructions stored in the memory 206 and/or the storage component 208 may cause the processor 204 to perform one or more processes described herein. Additionally, or alternatively, hardwired circuitry may be used in place of, or in combination with, software instructions to perform one or more of the processes described herein. Thus, embodiments described herein are not limited to any specific combination of hardware circuitry and/or software.

The number and arrangement of components shown in FIG. 2 are provided as an example. In some non-limiting embodiments, the computing device 200 may include additional components, fewer components, different components, or differently arranged components than those shown in FIG. 2. Additionally, or alternatively, a set of components (e.g., one or more components) of the computing device 200 may perform one or more functions described as being performed by another set of components of the computing device 200.

Figure 3:
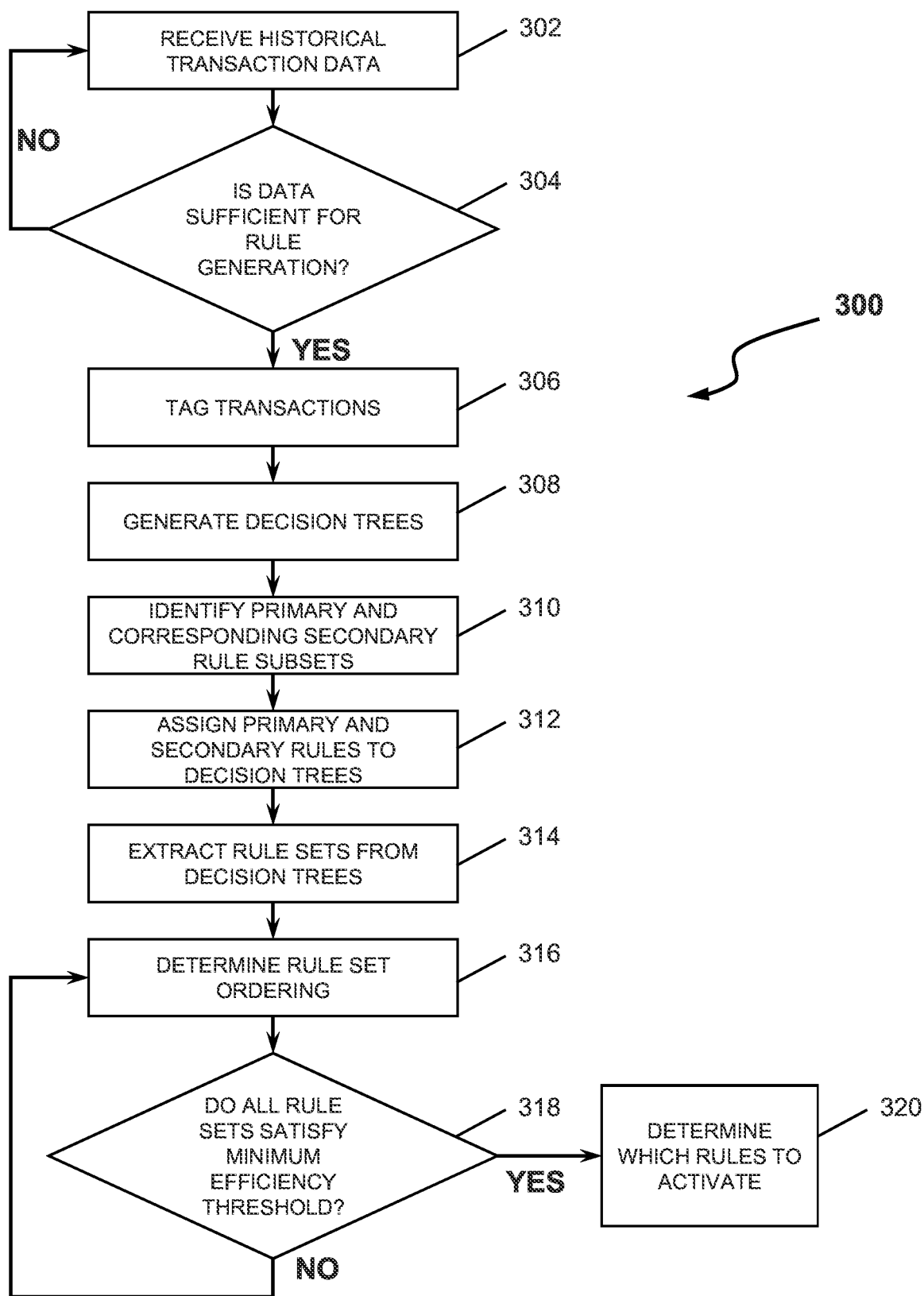
FIG. 3 is a flow diagram of a process for generating a set of fraud detection rules based on historical transaction data including both non-fraudulent transactions and fraudulent transactions.

Referring now to FIG. 3, illustrated is a sequence diagram for a non-limiting example of a process 300 for generating a set of fraud detection rules based on historical transaction data including both non-fraudulent transactions and fraudulent transactions. It will be understood that process 300 may be performed by some or all of the components illustrated in FIG. 1, with portions of process 300 capable of being performing with some or all of the functions described herein.

With continued reference to FIG. 3, in some non-limiting aspects or embodiments historical transaction data is received by a transaction service provider system 110 (block 302). The historical transaction data may include one or more transactions associated with an issuer system 102 during a period of time. The period of time may include dates and/or times prior to a day or time at which the historical transaction data is received by the transaction service provider. For example, historical transaction data may be received from the day prior to the day the historical transaction data is received, multiple days prior (e.g., 2, 3, 4 days), and/or over a period of multiple days prior (e.g., from 7-15 days). In some non-limiting aspects or embodiments, the day or days to which the historical transaction data corresponds may be further offset from the day the historical transaction data is received by a buffer period (e.g., transactions may be received starting from a predetermined amount of days prior to the day on which the historical transaction data is received looking backward therefrom. The buffer period may be based on input received at an input device at the issuer system 102 and/or the transaction service provider system 110. In some non-limiting aspects or embodiments, the buffer period may be determined or altered based on whether rule set orderings satisfy efficiency thresholds described later in detail.

The historical transaction data may include a plurality of fraudulent and/or non-fraudulent transactions processed by the transaction service provider system 110 and/or the issuer system 102. For example, the transactions may include data corresponding to particular data fields such as, without limitation, a customer identification number corresponding to an account maintained by a customer with an issuer associated with the transaction, a merchant identification number associated with the transaction, a timestamp associated with the transaction, a transaction value associated with the transaction, a transaction device identification number (e.g., a unique identifier associated with a payment device) associated with the transaction, and/or the like. Data corresponding to certain fields associated with the transaction may be derived from the data received from the initial transaction request such as, without limitation, a transaction time (e.g., a timestamp for the transaction may be associated with the transaction when an authorization request is received at the transaction service provider system 110 and/or the issuer system 102), a merchant location associated with a known geographic location of the merchant device 109 transmitting the authorization request, and/or the like).

Once the transaction service provider system 110 receives the historical transaction data, a determination is made as to whether the historical transaction data available is sufficient for rule generation (block 304). For example, if an issuer system 102 is associated with an issuer institution that is a smaller institution (e.g., a local bank) the amount of available transactions maintained by the issuer system 102 for a given time period may not be of a sufficient quantity to identify any pattern differences between non-fraudulent and/or fraudulent transactions. Conversely, if the issuer system 102 is associated with an issuer institution that is a larger institution (e.g., a national bank) the amount of available transactions maintained by the issuer system 102 for a given time period may be too large to process. In a case where the amount of available transactions associated with the transaction data is determined to be insufficient (e.g., either having a quantity too small or too large) ("NO" at block 304), the transaction service provider system 110 may increase or decrease the period associated with the historical transaction data, thereby increasing or decreasing the amount of transactions to be analyzed. For example, if too few transactions were received from historical transaction data corresponding to transactions performed between 5 and 10 days prior to the day the historical data was received, the transaction service provider system 110 may identify or otherwise request that the period be extended to between 5 and 15 days. Once the historical transaction data corresponds to a quantity of transactions sufficient for rule generation (e.g., a quantity greater than a minimum threshold and less than a maximum threshold) ("YES" at block 304) process 300 continues. In some non-limiting aspects or embodiments, historical transaction data may be aggregated across multiple issuer systems 102 to arrive at a sufficient quantity of transactions for rule generation. This is particularly advantageous in that, by aggregating these transactions (particularly with regard to time across small issuers), rules may be generated closer in proximity, temporally, to the date on which the historical transaction data is received. This enables the transaction service provider system 110 to generate rules that may be more relevant than would be achievable with a given amount of transactions available from a given issuer system 102 associated with a given issuer.

The transaction service provider system 110 may tag or otherwise associate an indication that each transaction associated with the historical transaction data was non-fraudulent and/or fraudulent (block 306). The tag may be verified by determining whether the transaction was approved, determining whether settlement of the transaction was successful, determining whether the transaction was contested by an account holder, and/or via other similar verification techniques. In some non-limiting aspects or embodiments, once tagged, the transactions may be processed to derive a set of features common to all transactions. In some non-limiting aspects or embodiments, these features may be selected based on the available and/or derived transaction data associated with some and/or all of the transactions corresponding to the historical transaction data.

The transaction service provider system 110 may generate a random forest model by generating and/or initializing a plurality of random forest decision trees, referred to herein as an initial set of decision trees (block 308). The initial set of decision trees may include decision trees, each of which include a root node to be associated with a primary rule and one or more child nodes operably coupled to the root node, the child nodes associated with unique secondary rules. The initial set of decision trees may be stored in memory of the transaction service provider system 110 using any suitable data structure. In some non-limiting aspects or embodiments, a depth limit may be set to a predetermined depth (e.g., decision trees may be generated and/or initialized as having seven or fewer decision levels (parent/child groups), and/or the like). This depth limit may be determined based on the amount of transactions associated with the historical transaction data, a predetermined limit, and/or a limit set by a user providing input at the issuer system 102 and/or the transaction service provider system 110.

The transactions service provider system 110 may identify a set of primary rules and corresponding secondary rule subsets (block 310). More particularly, in some non-limiting aspects or embodiments, features common to each transaction such as, without limitation, timestamps, locations, settlement status, and/or the like, may be selected and correlations identified between these features values associated with non-fraudulent transactions or fraudulent transactions. For example, the transaction service provider system 110 may compare feature values for non-fraudulent transactions and fraudulent transactions and, based on the comparison, determine that transactions initiated at a certain time period during the night are more likely to be fraudulent than transactions outside this time period. Based on the identification of this correlation between the feature values of fraudulent transactions and the feature values of non-fraudulent transactions (e.g., transactions falling within and outside of the time period, respectively), a primary rule may be identified. Similarly, the transaction service provider system may identify additional correlations across feature values associated with transactions identified as possibly and/or likely fraudulent when compared in view of the classification of transactions by a primary rule, these additional correlations identified as secondary rules. Building on the example noted above, transactions initiated during the time period may be identified as fraudulent if, during the time period, initiated in person (e.g., at a store) at a location greater than a predetermined distance from the home of the individual associated with the account. In some non-limiting aspects or embodiments, the secondary rules may be associated with, or independent of, a given primary rule (e.g., secondary rules may be correlated to primary rules at random). According to some non-limiting aspects or embodiments, both primary rules and secondary rules may be selected at random (e.g., without deriving any correlations between feature values and corresponding transaction tags indicating if the transactions are non-fraudulent transactions or fraudulent transactions).

The decision trees of the initial set of decision trees may be populated with sets of primary rules and corresponding secondary rule subsets (block 312). More particularly, decision trees from among the plurality of decision trees may be associated with a primary rule and a unique configuration of secondary rules, with primary or secondary rules associated with nodes of the decision trees. According to some non-limiting aspects or embodiments, none of the decision trees in any subset of decision trees may be the same (e.g., each decision tree may be unique).

Once populated, sets of rule set/subset orderings or rule sets may be extracted from the decision trees (block 314). These rule sets (referred to herein as final rules) may include discrete paths from a given primary rule to a given secondary rule, including all intervening secondary rules between the given primary rule and the given secondary rule. For example, given a decision tree having a primary rule "A", secondary rules "B" and "C", and corresponding secondary rules "B'", "B''" and "C'", "C''", discrete paths such as "A", "B", "B'"; "A", "B", "B''", etc. may be extracted to form a set of final rules. In some non-limiting embodiments, each node of the decision trees, and by extension each corresponding primary and/or secondary rule associated with each node, may be evaluated (either in isolation or based on classifications of earlier nodes) to determine one or more efficiency characteristics associated with classification of transactions with each node. For example, the decision trees may be traversed using a depth-first search pattern. As the trees are searched, each node may be evaluated in isolation (e.g., determining how well that individual rule is able to classify transactions) or based on earlier-classified transactions (e.g., based on an earlier classification, how likely is the instant rule to yield a correct classification). Evaluation may include determining that a given node accurately classifies transactions as either fraudulent or non-fraudulent beyond a predetermined threshold (e.g., with inaccurate identifications accounting for less than a predetermined threshold), the ratio of accurate identifications to inaccurate identifications exceeds a predetermined threshold, and/or that a given node has a false-positive identification rate less than a predetermined false-positive threshold.

The final rules may then be ordered (block 316). More particularly, the final rules may be placed in a random order or may be placed in an order based on their characteristics associated with the final rules (e.g., the length of the final rule compared to an average length of final rules included in the set of final rules), the efficiency of each final rule compared to one another across the set of final rules in accurately classifying non-fraudulent transactions and fraudulent transactions, and/or combinations of characteristics and efficiencies. The efficiency of a particular ordering of final rules may be determined by analyzing a portion of the historical transaction data with the ordered rules. More particularly, the portion of the historical transaction data may be compared against each of the final rules in a given order to classify each transaction as a non-fraudulent transaction or fraudulent transaction. As the historical transaction data is analyzed, the transaction service provider system 110 may determine how long the portion of historical transaction data took to be processed with the ordered rules and/or how accurate the ordered rules were at characterizing the transactions (e.g., how many transactions were properly categorized as non-fraudulent or fraudulent). While the ordering of final rules is determined to be inefficient, either by not having analyzed the portion of the historical data in a predetermined amount of time (as a fixed amount of time or ratio of time to transaction data volume) and/or by having too high of an error rate when characterizing the transactions ("NO" at block 318), the ordering of final rules is altered (block 316). For example, the ordering of the final rules may be randomly shuffled or final rules associated with a higher classification error rate than final rules with a lower classification error rate may be placed lower in the ordering and/or removed altogether from the ordering.

Once the ordering of final rules is determined to satisfy the minimum efficiency threshold ("YES" at block 318) the transaction service provider system 110 determines which final rules to activate (block 320). For example, the ordering of final rules may be transmitted to a display associated with the issuer system 102 and/or the transactions service provider system 110 to display the orderings of final rules which were determined to satisfy the minimum efficiency threshold, along with corresponding efficiency details (e.g., amount of time required to analyze an individual transaction or a group of transactions, etc.). In some non-limiting aspects or embodiments, in response to input received at the display of the issuer system 102 and/or the transaction service provider system 110, a set of final rules may be selected and activated. Additionally, or alternatively, the transaction service provider system 110 may select a set of final rules for activation based on the evaluated efficiency characteristics of the final rules. In some non-limiting aspects or embodiments, once the set of final rules are selected for activation, the issuer system 102 and/or the transaction service provider system 110 may compare subsequently-received transactions to the selected set of final rules and classify the subsequently-received transactions as non-fraudulent transactions or fraudulent transactions. Once classified, the issuer system 102 and/or the transaction service provider system 110 may approve or deny the subsequently-received transactions based on the classification. In some non-limiting aspects or embodiments, upon classification, the issuer system 102 and/or the transaction service provider system 110 may tag the transaction as a non-fraudulent transaction and/or a fraudulent transaction.

In some non-limiting aspects or embodiments, the set of final rules may be subdivided into one or more subsets of final rules and the subsequently-received transactions compared to the subsets of final rules in a multi-pass approach. For example, the set of final rules may be divided into first and second subsets of final rules. As transactions are received, the transactions may be compared to the first subset of final rules. If the transactions are classified as non-fraudulent transactions when compared to the first subset of final rules, the transactions may be approved without comparison to the transaction to the second subset of final rules. However, in some non-limiting aspects or embodiments, when comparison of transactions to the first subset of final rules results in a classification of the transactions as fraudulent, the transactions may be compared to the second subset of final rules. If upon comparison the transactions remain classified as fraudulent transactions, the transactions may be denied. However, if upon comparison the transaction is classified as non-fraudulent transactions, the transactions may be approved.

Referring now to FIG. 4, illustrated is a non-limiting example of a diagram of an implementation of a non-limiting aspect or embodiment of a process shown in FIG. 3. In this example, a transaction service provider system 110 receives historical transaction data from an issuer system 102 (402). The historical transaction data received from the issuer system includes transactions 1-N corresponding to transactions that the issuer system 102 processed from 8-13 days prior to the day on which the transaction service provider requested the historical transaction data. This date range includes transactions from within a predetermined range (5-10 days) and a buffer period of 3 days. The transactions are then tagged as being either non-fraudulent or fraudulent (406).

A random tree forest is generated, and may include any desired amount of trees (408). The random forest includes a plurality of trees having empty root nodes and corresponding child nodes operably coupled to the root nodes. From the tagged transactions, a plurality of rules are identified (410). These rules may be derived from common transaction parameters associated with each transaction, referred to as features. One non-limiting example of a rule may be that when a transaction occurs at a location greater than a predetermined distance from an account holder's residence, the transaction should be identified as fraudulent. Where multiple rules are associated with one another in a particular order, the first rule is referred to as a primary rule and the remaining rules secondary rules. For example, once a transaction is identified as fraudulent (e.g., when the transaction occurs at a location greater than a predetermined distance from the account holder's residence, as noted above), a secondary rule may be that if the account holder has transacted with the merchant during an earlier transaction, the instant transaction is not fraudulent. These primary and secondary rules may be assigned to nodes along the random forest trees (412). The primary and secondary rules may be assigned to nodes at random. Once assigned, rule sets are extracted from the random forest trees (414). Each rule set includes an ordering of primary and secondary rules. The orderings traverse the trees starting at the root node of each tree and extending to one or more child nodes. In some embodiments, the rule sets need not extend all the way to a child node that terminates (e.g., does not have any children nodes associated therewith).

The rule orderings may be compared to the set of historical transaction data tagged prior, or may be compared to a different set of historical transaction data that is tagged to determine the efficiency of each ordering. For example, a set of transactions may be tagged and withheld from use during rule generation (410) to be later used to determine the efficiency of each rule subset. Rules that are able to process transactions with a certain degree of efficiency (e.g., are able to properly categorize transactions as fraudulent and/or non-fraudulent with a margin of error less than a predetermined amount, are able to process transactions in a predetermined amount of time, etc.) are given higher priority in the rule ordering, whereas rules that are less efficient are given a lower priority. A final ordering may be established (416). This ordering may later be truncated to remove rules that are less efficient (e.g., by removing rules given a lower priority).

Although the presently-disclosed systems and methods are described in detail for the purpose of illustration based at least partially on what is currently considered to be the most practical and preferred embodiments, it is to be understood that such detail is provided solely for that purpose and that the principles described by the present disclosure are not limited to the disclosed embodiments. On the contrary, the principles described by the present disclosure are intended to cover modifications and equivalent arrangements that are within the spirit and scope of the appended claims. For example, it is to be understood that the present disclosure contemplates that, to the extent possible, one or more features of any aspect or embodiment may be combined with one or more features of any other aspect or embodiment.

What is claimed is:

1. A computer-implemented method comprising:
   receiving, with at least one processor, transaction data associated with a plurality of transactions, the plurality of transactions including a plurality of non-fraudulent transactions and a plurality of fraudulent transactions;
   generating, with at least one processor, at least one decision tree having a root node and at least one child node operably connected to the root node based on the transaction data associated with the plurality of transactions;
   determining, with at least one processor, at least one primary rule and at least one set of secondary rules associated with the at least one primary rule based on the plurality of non-fraudulent transactions and the plurality of fraudulent transactions;
   populating, with at least one processor, the at least one decision tree based on the at least one primary rule and the at least one set of secondary rules;
   extracting, with at least one processor, a plurality of rule sets from the at least one decision tree;
   determining, with at least one processor, an ordering of the plurality of rule sets based on memory-based efficiency characteristics and fraud-detection-based characteristics associated with each rule set of the plurality of rule sets; and
   determining, with at least one processor, whether the ordering of the plurality of rule sets satisfy a minimum efficiency threshold.

2. The computer-implemented method according to claim 1, further comprising:
   transmitting the ordering of the plurality of rule sets to a first terminal to be displayed on a display of the first terminal;
   receiving instructions to activate at least one selected rule set from among the ordering of the plurality of rule sets based on input received at the first terminal;
   activating the at least one selected rule set;
   receiving a subsequent transaction from the first terminal; and
   comparing the subsequent transaction to the at least one selected rule set.

3. The computer-implemented method according to claim 1, further comprising:
   activating a subset of rule sets from the ordering of the plurality of rule sets against which subsequently received transactions are compared against;
   receiving a subsequent transaction from a transaction terminal;
   comparing the subsequent transaction to the subset of rule sets; and
   transmitting an authorization message based on comparing the subsequent transaction to the subset of rule sets.

4. The computer-implemented method according to claim 3, wherein comparing the subsequent transaction to the subset of rule sets comprises:
   comparing the subsequent transaction to the subset of rule sets using a two-pass analysis progression.

5. The computer-implemented method according to claim 1, wherein the method further comprises:
   receiving additional transaction data associated with a plurality of transactions from at least a day prior to a day the transaction data is received, wherein the plurality of transactions from at least a day prior to a day the transaction data is received comprises a quantity of transactions less than a predetermined amount.

6. The computer-implemented method according to claim 5, wherein receiving the additional transaction data comprises:
   receiving additional transaction data from at least one additional day prior to a last date the transaction data was received at an issuer institution; and
   wherein a day the additional transaction data is received is a day before a buffer period of days prior to the day the transaction data is received.

7. The computer-implemented method according to claim 1, wherein generating the at least one decision tree comprises:
   limiting a depth of the at least one decision tree to a predetermined depth.

8. The computer-implemented method according to claim 1, the method further comprising:
   determining a subset of rule sets from the ordering of the plurality of rule sets against which subsequently received transactions are compared against to determine if the subsequently received transactions are non-fraudulent transactions or fraudulent transactions.

9. A system comprising:
   at least one processor programmed or configured to:
   receive transaction data associated with a plurality of transactions, the plurality of transactions including a plurality of non-fraudulent transactions and a plurality of fraudulent transactions;
   generate at least one decision tree having a root node and at least one child node operably connected to the root node based on the transaction data associated with the plurality of transactions;
   determine at least one primary rule and at least one set of secondary rules associated with the at least one primary rule based on the plurality of non-fraudulent transactions and the plurality of fraudulent transactions;
   populate the at least one decision tree based on the at least one primary rule and the at least one set of secondary rules;

extract a plurality of rule sets from the at least one decision tree;

determine an ordering of the plurality of rule sets based on memory-based efficiency characteristics and fraud-detection-based characteristics associated with each rule set of the plurality of rule sets; and determine whether the ordering of the plurality of rule sets satisfy a minimum efficiency threshold.

10. The system according to claim 9, wherein the at least one processor is further programmed or configured to:

transmit the ordering of the plurality of rule sets to a first terminal to be displayed on a display of the first terminal;

receive instructions to activate at least one selected rule set from among the ordering of the plurality of rule sets based on input received at the first terminal;

activate the at least one selected rule set;

receive a subsequent transaction from the first terminal; and compare the subsequent transaction to the at least one selected rule set.

11. The system according to claim 9, wherein the at least one processor is further programmed or configured to:

activate a subset of rule sets from the ordering of the plurality of rule sets against which subsequently received transactions are compared against;

receive a subsequent transaction from a transaction terminal;

compare the subsequent transaction to the subset of rule sets; and transmit an authorization message based on comparing the subsequent transaction to the subset of rule sets.

12. The system according to claim 11, wherein, when comparing the subsequent transaction to the subset of rule sets, the at least one processor is programmed or configured to:

compare the subsequent transaction to the subset of rule sets using a two-pass analysis progression.

13. The system according to claim 9, wherein the at least one processor is further programmed or configured to:

receive additional transaction data associated with a plurality of transactions from at least a day prior to a day the transaction data is received, wherein the plurality of transactions from at least a day prior to a day the transaction data is received comprises a quantity of transactions less than a predetermined amount.

14. The system according to claim 13, wherein, when receiving the additional transaction data, the at least one processor is programmed or configured to:

receive additional transaction data from at least one additional day prior to a last date the transaction data was received at an issuer institution; and wherein a day the additional transaction data is received is a day before a buffer period of days prior to the day the transaction data is received.

15. The system according to claim 9, wherein, when generating the at least one decision tree, the at least one processor is programmed or configured to:

limit a depth of the at least one decision tree to a predetermined depth.

16. The system according to claim 9, wherein the at least one processor is further programmed or configured to:

determine a subset of rule sets from the ordering of the plurality of rule sets against which subsequently received transactions are compared against to determine if the subsequently received transactions are non-fraudulent transactions or fraudulent transactions.

17. A computer program product comprising at least one non-transitory computer readable medium including one or more instructions that, when executed by at least one processor, cause the at least one processor to:

receive transaction data associated with a plurality of transactions, the plurality of transactions including a plurality of non-fraudulent transactions and a plurality of fraudulent transactions;

generate at least one decision tree having a root node and at least one child node operably connected to the root node based on the transaction data associated with the plurality of transactions;

determine at least one primary rule and at least one set of secondary rules associated with the at least one primary rule based on the plurality of non-fraudulent transactions and the plurality of fraudulent transactions;

populate the at least one decision tree based on the at least one primary rule and the at least one set of secondary rules;

extract a plurality of rule sets from the at least one decision tree;

determine an ordering of the plurality of rule sets based on memory-based efficiency characteristics and fraud-detection-based characteristics associated with each rule set of the plurality of rule sets; and determine whether the ordering of the plurality of rule sets satisfy a minimum efficiency threshold.

18. The computer program product according to claim 17, wherein the one or more instructions, when executed by the at least one processor, further cause the at least one processor to:

transmit the ordering of the plurality of rule sets to a first terminal to be displayed on a display of the first terminal;

receive instructions to activate at least one selected rule set from among the ordering of the plurality of rule sets based on input received at the first terminal;

activate the at least one selected rule set;

receive a subsequent transaction from the first terminal; and compare the subsequent transaction to the at least one selected rule set.

19. The computer program product according to claim 17, wherein the one or more instructions, when executed by the at least one processor, further cause the at least one processor to:

activate a subset of rule sets from the ordering of the plurality of rule sets against which subsequently received transactions are compared against;

receive a subsequent transaction from a transaction terminal;

compare the subsequent transaction to the subset of rule sets; and transmit an authorization message based on comparing the subsequent transaction to the subset of rule sets.

20. The computer program product according to claim 17, wherein the one or more instructions, when executed by the at least one processor, further cause the at least one processor to:

determine a subset of rule sets from the ordering of the plurality of rule sets against which subsequently received transactions are compared against to determine if the subsequently received transactions are non-fraudulent transactions or fraudulent transactions.

* * * * *